(12) United States Patent
Slade

(10) Patent No.: US 12,562,298 B2
(45) Date of Patent: Feb. 24, 2026

(54) QUENCH PROTECTION IN HIGH-TEMPERATURE SUPERCONDUCTING MAGNETS

(71) Applicant: Tokamak Energy Ltd., Abingdon (GB)

(72) Inventor: Robert Slade, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 360 days.

(21) Appl. No.: 18/454,225

(22) Filed: Aug. 23, 2023

(65) Prior Publication Data

US 2023/0402213 A1     Dec. 14, 2023

Related U.S. Application Data

(62) Division of application No. 16/346,030, filed as application No. PCT/GB2017/053066 on Oct. 10, 2017, now Pat. No. 11,776,721.

(30) Foreign Application Priority Data

Oct. 31, 2016     (GB) ...................................... 1618333

(51) Int. Cl.
　　*H01F 6/02*　　　(2006.01)
　　*G01K 11/32*　　(2021.01)
　　　　　　(Continued)
(52) U.S. Cl.
　　CPC ............... *H01F 6/02* (2013.01); *G01K 11/32* (2013.01); *G21B 1/21* (2013.01); *G21B 1/23* (2013.01);
　　　　　　(Continued)

(58) Field of Classification Search
　　CPC .......... H10N 60/80; H01B 7/324; H01F 6/02; G21B 1/21; G21B 1/23;
　　　　　　(Continued)

(56) References Cited

U.S. PATENT DOCUMENTS 3,818,396 A     6/1974   Raphael
5,668,515 A     9/1997   Ariyoshi
　　　　　(Continued)

FOREIGN PATENT DOCUMENTS

EP     0350264     1/1990
GB     1445351     8/1976
　　　　(Continued)

OTHER PUBLICATIONS

Computer translation of JP_2007141713_A downloaded from the JPO website (Year: 2025).*

(Continued)

*Primary Examiner* — Randy W Gibson
(74) *Attorney, Agent, or Firm* — Michael Best & Friedrich LLP

(57)　　　　　ABSTRACT

A superconducting magnet comprising a field coil comprising high temperature superconducting material and having a joint; a bypass resistance comprising a non-superconducting conductive material, wherein the bypass resistance is electrically connected to the field coil on both sides of the joint; wherein the joint is openable to break the field coil such that current flowing in the superconductor flows though the bypass resistance in order to dump energy from the field coil, and wherein the superconducting magnet is configured to open the joint in response to detection of a quench in the magnet.

10 Claims, 4 Drawing Sheets

(51) Int. Cl.

| | | |
|---|---|---|
| *G21B 1/21* | (2006.01) | |
| *G21B 1/23* | (2006.01) | |
| *H01F 6/06* | (2006.01) | |
| *H02H 1/00* | (2006.01) | |
| *H02H 7/00* | (2006.01) | |

(52) U.S. Cl.
CPC ........... *H01F 6/065* (2013.01); *H02H 1/0007* (2013.01); *H02H 7/001* (2013.01)

(58) Field of Classification Search
CPC .. G01K 11/32–11/324; G01D 5/35361; G01D 5/35374; H02H 1/0007; H02H 7/001
See application file for complete search history.

(56) References Cited

U.S. PATENT DOCUMENTS

| | | | | |
|---|---|---|---|---|
| 8,672,539 | B2 * | 3/2014 | Skinner .................... | G01K 1/14 |
| | | | | 374/161 |
| 2007/0152787 | A1 | 7/2007 | Spreiter et al. | |
| 2014/0268130 | A1 | 9/2014 | Omichi et al. | |
| 2015/0377991 | A1 | 12/2015 | Astra et al. | |
| 2017/0179364 | A1 | 6/2017 | Schwartz et al. | |
| 2018/0143041 | A1 * | 5/2018 | Johnston ............... | E21B 47/135 |

FOREIGN PATENT DOCUMENTS

| | | | | |
|---|---|---|---|---|
| GB | 2510447 | | 8/2014 | |
| GB | 2528272 | | 1/2016 | |
| GB | 2535198 | | 8/2016 | |
| GB | 2618376 A | * | 11/2023 | ......... G01D 5/35361 |
| JP | H04237105 A | | 8/1992 | |
| JP | 09230074 | | 9/1997 | |
| JP | 2007141713 | | 6/2007 | |
| JP | 2007141713 A | * | 6/2007 | |
| JP | 2009172085 A | | 8/2009 | |
| JP | 5975064 B2 | * | 8/2016 | ............. G01K 11/32 |
| WO | 2013052024 A1 | | 4/2013 | |
| WO | WO-2015073000 A1 | * | 5/2015 | ........... E21B 47/135 |

OTHER PUBLICATIONS

Computer translation of JP_59755064_B2 (Year: 2025).*

Extended European Search Report for Application No. 21185288.4 dated Nov. 10, 2021 (11 pages).

Extended European Search Report for Application No. 21185162.1 dated Dec. 17, 2021 (7 pages).

International Search Report and Written Opinion for Application No. PCT/GB2017/053066 dated Mar. 21, 2018 (20 pages).

Scurti et al., "Quench detection for high temperature superconductor magnets: a novel technique based on Rayleigh-backscattering interrogated optical fibers," Superconductor Science and Technology, IOP Publishing, Techno House, Bristol, GB, vol. 29, No. 3, Jan. 21, 2016.

Sorbom et al., "ARC: A compact, high-field, fusion nuclear science facility and demonstration power plant with : lemountable magnets," Fusion Engineering and Design, vol. 100, Nov. 2015, pp. 378-405.

Search Reports from the UK Intellectual Property Office for Application No. 1618333.7 mailed Apr. 26, 2017 (7 pages).

Takahata et al., "Internal energy dump for superconducting magnet protection of the LHD-type fusion reactor FFHR," Proc. ITC/ISHW, 2007.

Search Report from the UK Intellectual Property Office for Application No. 1618333.7 mailed Feb. 3, 2017 (5 pages).

Chan et al., "Spatial and temporal resolution requirements for quench detection in (RE) Ba2Cu30x magnets using Rayleigh-scattering-based fiber optic distributed sensing" Superconductor Science and Technology 26(10), 105015, 2013.

Mangiarotti, "Design of demountable toroidal field coils with REBCO superconductors for a fusion reactor" Diss. Massachusetts Institute of Technology, 2016.

David Kingham and George Smith; Shielding materials for fusion reactors; Publication date: Jan. 20, 2016; drawings and entire specification, abstract; GB 2528272 A (Year: 2016).

Alan Sykes; Toroidal field coil for use in a fusion reactor; GB 2510447; Publication date: Jun. 8, 2014; drawings, abstract, and entire specification (Year: 2014).

* cited by examiner

Copper Insert                    HTS Tape

Copper Contact Face

QUENCH PROTECTION IN HIGH-TEMPERATURE SUPERCONDUCTING MAGNETS

CROSS-REFERENCE TO RELATED APPLICATIONS

This patent application is a divisional of U.S. application Ser. No. 16/346,030, filed on Apr. 29, 2019, which is a national stage filing under 35 U.S.C. 371 of International Application No. PCT/GB2017/053066, filed on Oct. 10, 2017, which claims priority to GB Application No. 1618333.7, filed on Oct. 31, 2016. These applications are incorporated herein by reference in their entireties.

FIELD OF THE INVENTION

The invention relates to superconducting magnets. More particularly, the invention relates to methods and apparatus for quench protection in such magnets, and especially in magnets for use in nuclear fusion reactors.

BACKGROUND

A superconducting magnet is an electromagnet formed from coils of a superconducting material. As the magnet coils have zero resistance, superconducting magnets can carry high currents with zero loss (though there will be some losses from non-superconducting components), and can therefore reach high fields with lower losses than conventional electromagnets.

Superconductivity only occurs in certain materials, and only at low temperatures. A superconducting material will behave as a superconductor in a region defined by the critical temperature of the superconductor (the highest temperature at which the material is a superconductor in zero applied magnetic field) and the critical field of the superconductor (the highest magnetic field in which the material is a superconductor at OK). The temperature of the superconductor and the magnetic field present limit the current which can be carried by the superconductor without the superconductor becoming resistive (or "normal", used herein to mean "not superconducting"). There are two types of superconducting material: type I superconductors totally exclude magnetic flux penetration and have a low critical field, type II allow flux to penetrate the superconductor above the lower critical field within localized normal regions called flux vortices. They cease to be superconducting at the upper critical field. This feature enables them to be used in wires for construction of superconducting magnets. Significant effort is made to pin the flux vortex sites to the atomic lattice, which improves critical current at higher magnetic fields and temperatures.

Broadly speaking, there are two categories of type 2 superconductors. Low temperature superconductors (LTS) have critical temperatures below 20K, and high temperature superconductors (HTS) have critical temperatures above 40K. Many current HTS materials have critical temperatures above 77K, which allows the use of liquid nitrogen for cooling.

One problem which can occur in superconducting magnets is quenching. Quenching occurs when a part of the superconducting wire or coil enters the resistive state. This may occur due to fluctuations in temperature or magnetic field, or physical damage or defects in the superconductor (e.g. by neutron irradiation if the magnet is used in a fusion reactor). Due to the high currents present in the magnet, when even a small part of the superconductor becomes resistive, it quickly heats up. All superconducting wires are provided with some copper stabilizer for quench protection. The copper provides an alternative path for current if the superconductor becomes normal. The more copper that is present, the slower the temperature rises in the hot spot that forms around a region of quenched conductor.

In LTS magnets, when a quench occurs the "normal zone" will propagate rapidly—on the order of a few metres per second. This occurs due to the low heat capacity of all materials at low temperature, and the fact that LTS materials are generally operated much closer to their critical temperatures. This means that a quench propagates quickly in a LTS magnet, and the stored magnetic field energy dissipated in the quench will be spread throughout the magnet, warming it up.

HTS materials, being operated at high temperatures, have a higher specific heat capacity, so the energy required to bring a section of the wire to the normal state is much greater. This means that quenches are much less likely in HTS magnets than in LTS magnets. However, it also means that the normal zone propagation velocity is much slower—on the order of a few millimetres per second compared to metres per second in LTS magnets. Since the quench will initially only affect a small volume of the magnet, only that area will be resistive—and therefore the energy dissipated during the quench will be dumped into that small volume (or, more specifically, into the copper where the current from the normal zone is diverted). This concentration of energy can cause permanent damage to the HTS tape, e.g. melting, arc discharge, etc. This is further compounded as HTS magnets are typically indirectly cooled, rather than being immersed in a bath of liquid coolant—so the "spot" cooling power is reduced compared to LTS magnets.

The energy stored in the magnetic field is given by:

$$W = \frac{1}{2} \int B.H dr$$

I.e. the greater the flux density and the higher the volume, the greater the stored energy of the magnet. The energy released by a large magnet can be on a similar order to a stick of dynamite exploding. For an LTS magnet, this energy may be dissipated over the whole magnet. For an HTS magnet without quench protection, this energy may be dissipated in a small fraction of the magnet's volume. In general a large HTS magnet will require an active quench protection system comprising a detection phase, during which the quench is detected before significant heating has occurred, followed by a dissipation phase, during which the magnet current is rapidly ramped down.

The role of a quench protection system is to detect a quench (either as soon as possible after starting, to minimise damage, or before initiation, by detecting the transfer of current from the superconductor to the copper stabilizer), and to dump the magnet's stored energy into an external load. The energy dump may be achieved by routing current through an external resistor, by using the stored energy to heat the "cold mass" of the magnet, or by artificially propagating the quench faster through the superconducting coils (so that the energy is dissipated through the whole magnet, which warms up). Artificial propagation is unlikely to be effective for HTS magnets, as approaches using heaters would be too slow to quench the entire magnet.

The conventional approach to quench detection is to use pairs of voltage taps across the superconducting coils. In essence, the voltage across the coil is measured, and if any voltage is detected outside a specified band of voltages, then this is a sign that a part of the coil has become resistive and a quench is starting. For LTS, where the resistive zone is relatively large, this approach works. However, for HTS magnets, the initial hot zone is generally very small, and so the resistance (and therefore the voltage generated) is low. The magnet would be permanently damaged before any measurable voltage is generated. During energisation of the magnet, there will also be inductive voltage effects which may swamp the resistive voltage, even if efforts are made to cancel these out. Filtering a genuine quench signal from a noisy background signal takes time, and has a high error rate.

Most HTS magnets built to date (using BSCCO and ReBCO coated conductors) do not in fact have quench protection. This is because they are mostly small, low cost prototypes, with little stored energy, and because a quench in a well-designed HTS magnet should have a very low probability, as mentioned. The decision whether to quench protect an HTS magnet is therefore essentially an economic one: a small prototype magnet can be repaired relatively easily in the rare event that it quenches. As a consequence, quench protection technology for HTS magnets is still immature.

However, HTS magnets are beginning to be considered for use in nuclear fusion reactors. Such magnets are much bigger than those previously designed using HTS material. The toroidal field (TF) magnet for even a relatively small tokamak would be, by far, the largest HTS magnet built to date, and represents a large magnet with high stored energy even by LTS standards. A thoroughly developed quench protection system which can cope with critical current degradation in the conductor is essential. The stored energy of the TF magnet (~4.5 T) for a spherical tokamak operating with a 60 cm major radius will be 150-200 MJ, and the TF magnet (~3 T) for a 140 cm tokamak will be in excess of 1500 MJ.

The role of the HTS quench protection system is therefore to (a) quickly detect a quench, or incipient quench, and (b) dump the magnet's stored energy promptly into an external resistance and/or into the magnet's cold mass, warming it in the process.

SUMMARY

According to a first aspect, there is provided a method of detecting quenches in a superconducting magnet comprising a plurality of jointed cable sections comprising HTS material in a coil, the method comprising:
    providing a plurality of optical fibres, wherein each cable of the coil of the superconducting magnet is in thermal contact with at least one of the optical fibres; monitoring backscattered light from each of the optical fibres; comparing changes in wavelength of backscattered light from each optical fibre; detecting a change in temperature of a cable of the coil on the basis of a change in wavelength observed in one or more first optical fibres of the plurality of optical fibres which are in thermal contact with the cable, but not observed in second optical fibres of the plurality of optical fibres which are not in thermal contact with the cable; and in response to said detection, determining that the cable has quenched.

According to a second aspect, there is provided a method of detecting quenches in a superconducting magnet comprising a plurality of cables comprising HTS material in a coil, comprising:
    providing a plurality of optical fibres, wherein each cable of a coil of the superconducting magnet is in thermal contact with at least one of the optical fibres;
    monitoring backscattered light from each of the optical fibres;
    comparing changes in wavelength of backscattered light from each optical fibre;
    detecting a change in temperature of one or more cables of the coil on the basis of a change in wavelength observed only a subset of the plurality of optical fibres, but not observed in the rest of the optical fibres; and
    in response to said detection, determining that the cable has quenched.

According to a further aspect, there is provided a superconducting magnet comprising: a plurality of turns comprising cables comprising HTS superconducting material; a plurality of optical fibres, wherein each cable is in thermal contact with at least one of the optical fibres;
    a control unit configured to:
    monitor backscattered light from each of the optical fibres;
    compare changes in wavelength of backscattered light from each optical fibre;
    detect a change in temperature of a cable of the coil on the basis of a change in wavelength observed in one or more first optical fibres of the plurality of optical fibres which are in thermal contact with the cable, but not observed in second optical fibres of the plurality of optical fibres which are not in thermal contact with the cable; and on the basis of said detection, determine that the cable has quenched.

According to a further aspect, there is provided a toroidal field coil assembly for use in a nuclear fusion reactor, the assembly comprising:
    a toroidal field coil comprising high temperature superconductor;
    neutron shielding configured to shield the high temperature superconductor from neutrons emitted by a nuclear fusion reaction;
    wherein the neutron shielding is conductive and is configured to operate as a shorted inductive coil magnetically coupled to the toroidal field coil.

According to a further aspect, there is provided a cable comprising:
    high temperature superconductor,
    a first copper stabiliser in electrical contact with the high temperature superconductor, and
    a second copper stabiliser electrically insulated from the high temperature superconductor and the first copper stabiliser,
    such that when the cable is wound so that the high temperature superconductor forms a magnetic field coil the second copper stabiliser forms a shorted inductive coil magnetically coupled to the magnetic field coil.

According to a further aspect, there is provided a superconducting magnet comprising: a field coil comprising high temperature superconducting material and having a joint; a bypass resistance comprising a non-superconducting conductive material, wherein the bypass resistance is electrically connected to the field coil on both sides of the joint; wherein the joint is openable to break the field coil such that current flowing in the superconductor flows though the bypass resistance in order to dump energy from the field coil, and wherein the superconducting magnet is configured to open the joint in response to detection of a quench in the magnet.

Further embodiments are described in claim 2 et seq.

DETAILED DESCRIPTION

There are three possible approaches to improving quench protection in HTS magnets. Firstly, improvements can be made to the detection of quenches, so that they can be quickly identified and the energy quickly dumped to an external load before damage can occur. Secondly, the dumping systems can be improved to speed up the energy dump from the magnet once the quench is detected. Thirdly, improvements to magnet structure can be made to increase the time between a quench starting and significant damage to the magnet occurring. Ideally, the quench should be detected and the energy dumped before any significant damage occurs.

Considering the second approach, HTS magnets are generally made from a plurality of turns of HTS cable, each HTS cable comprising a number of HTS tapes in electrical contact (which may be in a variety of configurations). The electrical contact is typically provided by a copper stabiliser. When a quench occurs in an HTS tape, the current can commute via the copper into one of the other HTS tapes in the cable, bypassing the quench (and limiting the resistive losses to those caused by the current changing tapes). The single-tape quench will likely cause some degradation in the critical current of that tape (and therefore of the cable as a whole), so the magnet must be designed with sufficient redundancy that such small quenches will not require the cable to be decommissioned (i.e. where the critical current of the cable falls below the required current). The role of the quench protection system is to minimise the damage to the tapes, and so minimise the degradation in the critical current.

As noted above, a single-tape quench will cause current to be redistributed to the other tapes, as well as causing some resistive losses. Either the excess current or the heat generated may cause other tapes of the cable to quench—which will result in a "cascade", as the second tape quenching causes more heating, and increases the current in the remaining superconducting tapes—causing more tapes to quench until the entire cable is normal. Single-tape quenches which do not result in the quenching of the entire cable are unwanted but not necessarily significantly damaging. Quenches of the whole cable will cause significant damage to the magnet if the detection and dump time is too long. In work on HTS magnets done by CERN, the time between a single-tape quench beginning and the entire cable quenching is called the "pre-quench" phase, and that terminology will be used here. Provided that the quench can be detected and the energy dumped from the magnet during this pre-quench phase, then damage to the HTS magnet can be avoided.

Quench Detection

Figure 1A:
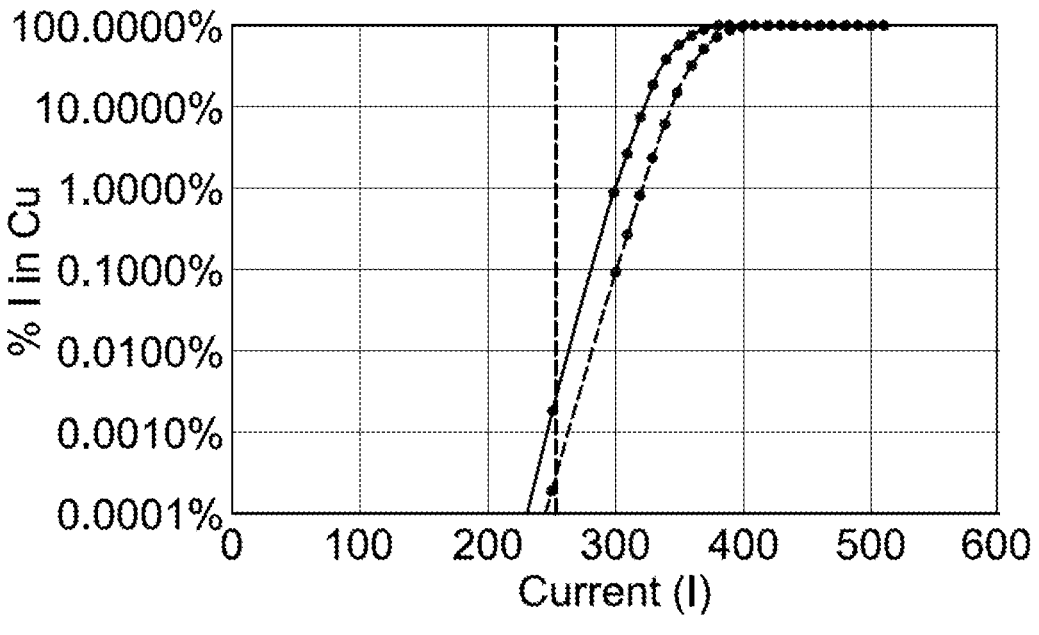
FIG. 1A is a graph of current in the copper cladding against HTS current for exemplary field coils.
Figure 1B:
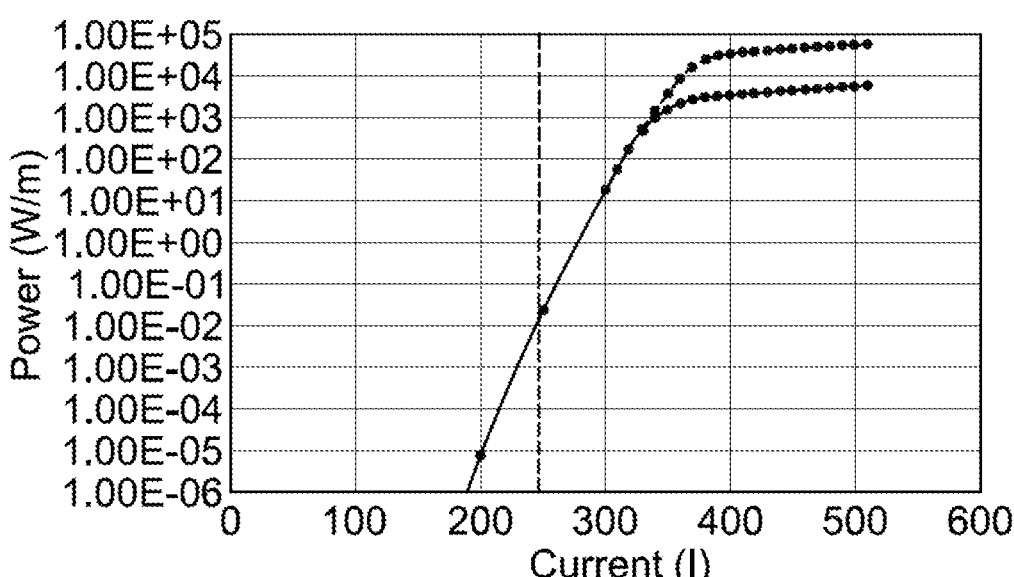
FIG. 1B is a graph of power lost against HTS current for exemplary field coils.

As noted in the background, the voltage across a quench in an HTS magnet is tiny —because the quench is so localised, the overall resistance is very low (even though the resistance per unit length is high compared to the superconductor). Furthermore, modelling has shown that there is significant heat load before any voltage change would occur. Consider FIGS. 1A and 1B, which are graphs of current fraction in the copper, and total loss (in watts per metre) against current for 4 mm wide HTS tapes with critical current of 250 A. In each case, the vertical line shows the critical current (250 A), the orange graph is for a tape with 200 microns of copper, and the blue graph is for a tape with 20 microns of copper. Both graphs show results of a simple model, which does not consider the effects on the resistances of the tape components due to temperature rise caused by the heating, but this is not significant for currents below the critical current.

As can be seen, there is some current in the copper layer even before the current in the tape reaches the critical current (e.g. from about 225 A). However, even before then there are power losses (i.e. heating). At 80% of the critical current, the power loss is less than 10 microwatts per metre—which would be negligible for a tokamak (it amounts to about 40 W for the whole magnet). At the critical current, the power loss is around 25 milliwatts per metre—more than enough to cause a measurable temperature rise (which, in practice, would reduce the critical current and cause further power loss). All of this occurs below the critical current—where the current in the copper is less than 0.002% of the current in the HTS tape, and would not be detectable.

From the above, it is clear that detection by electromagnetic methods is not going to be sensitive enough to pick up quenches in HTS tapes, except perhaps as a redundant detection method. Detecting the local rise in temperature that occurs when the transport current rises above 80% of the critical current is strongly preferred.

Previous work (Scurti, F., et al. "Quench detection for high temperature superconductor magnets: a novel technique based on Rayleigh-backscattering interrogated optical fibers." Superconductor Science and Technology 2) has shown the feasibility of using optical fibre to detect temperature variation in single HTS tapes. The technique relies on back-scattering from naturally occurring defects along the fibre. Any change to strain or temperature along the fibre will change the wavelength of the back-scattered light. There may also be changes due to neutron damage, but more work is needed to determine this.

The detection method is processor intensive—there is a trade-off between speed of detection and spatial resolution. However, for quench prevention it is unimportant where the quench is occurring, so a relatively fast computation can be used. Position information may be useful after the fact, to determine the causes of the quench, but at the time of the quench it is most important to shut the magnet down as soon as possible.

A more significant issue with the method in Scurti is that it is not possible to differentiate between changes in strain, and changes in temperature. In an HTS magnet, there will be significant and changing strains, which may cause false alarms or mask the temperature change of a quench. A practical system based on Scurti can be developed using multiple fibres for each magnet coil—e.g. one per turn of the coil, or even more. Strain changes in the magnet will be uniform and global, so will affect all fibres equally. Temperature changes due to a quench will only occur in a single turn, so will be localised to one or a few fibres of the coil. These conditions can be discriminated in real-time by a suitable detection system which takes signals from all of the fibres. There is a possibility that abnormal strain conditions would result in a strain signal in only a single fibre—but such conditions would also be a reason to shut down the magnet, so this is not an issue in practice.

Such a system can also be used to measure the strain (and possibly neutron damage) in the coils, and so could help to monitor other aspects of the functioning of the magnet.

Energy Dumping

Figure 2:
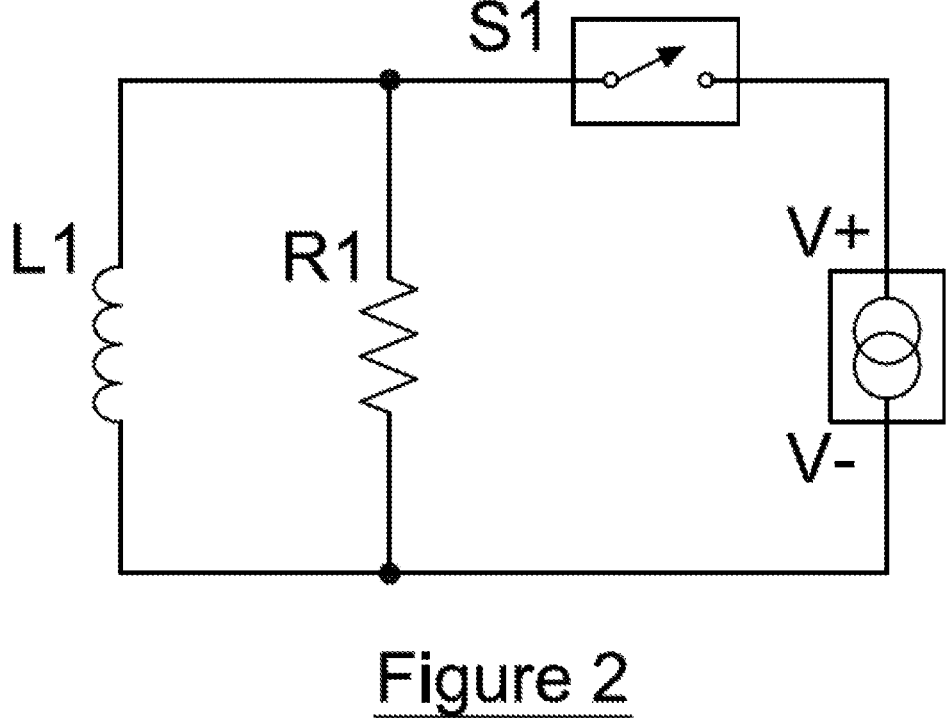
FIG. 2 is a schematic of a dump circuit.

A schematic model of a conventional dump circuit is shown in FIG. 2. During normal operation, the switch S1 is closed, connecting the magnet L1 to the power supply V+. Since the magnet L1 has negligible resistance, the load R1 is effectively shorted out, and very little current passes through it. When a quench is detected, the switch S1 is opened, which disconnects the power supply and causes the magnet and the load to form a closed circuit. Current passes through the load R1, discharging the magnet.

Figure 3:
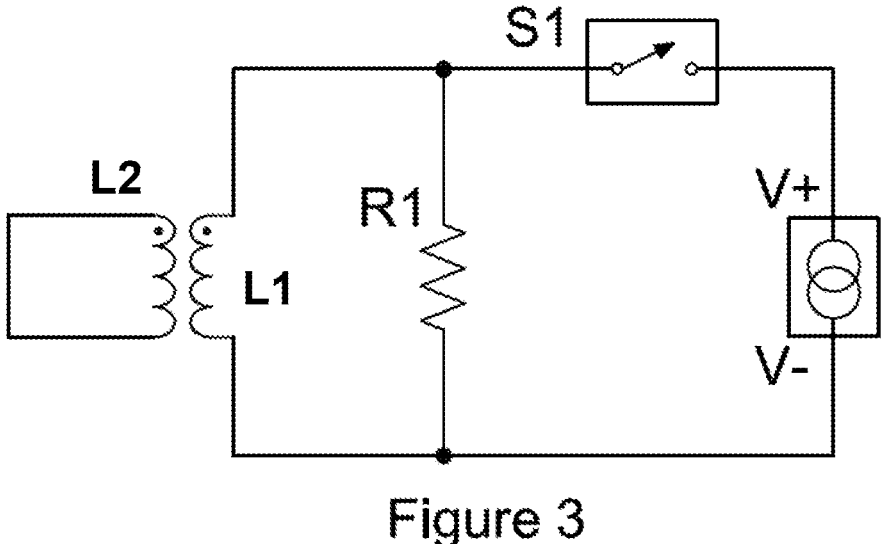
FIG. 3 is a schematic of a further dump circuit.
Figure 4:
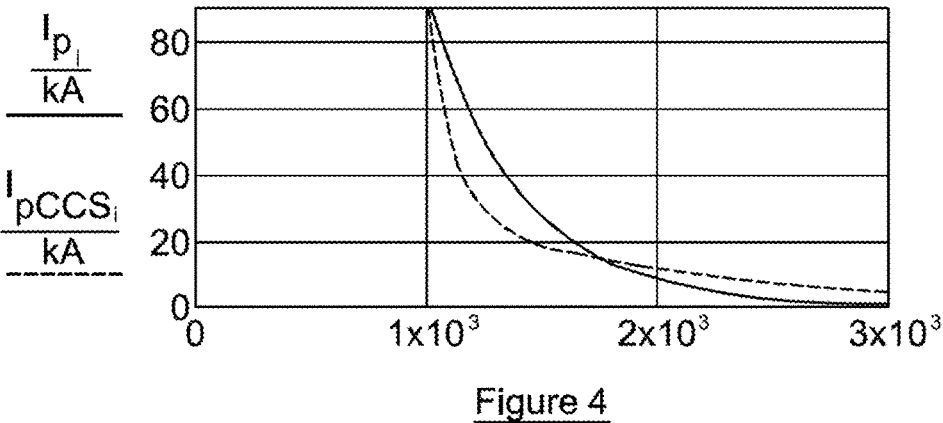
FIG. 4 is a graph of current over time for the dump circuits of FIGS. 2 and 3.

The rate of discharge can be improved by coupling a shorted secondary coil to the magnet, as shown in FIG. 3. When the switch S1 is opened, the magnetic field collapse in the magnet L1 causes a large current to be induced in the shorted secondary coil L2. This results in a sharp drop in the current of the primary coil, as shown in FIG. 4 (the red line is with the circuit of FIG. 2, and the blue line is with the circuit of FIG. 3—the dump is initiated at t=1 s). This reduces the heating of the magnet after the dump begins.

In a tokamak for use as a nuclear fusion reactor, e.g. a spherical tokamak, the design constraints are very tight—each component must be as compact as possible. The shorted secondary coil can be provided in a way that is integrated into other components of the reactor. For example, if tungsten carbide or another conductive material is used as the neutron shield for the magnet, then the neutron shield can be connected to itself around each toroidal return limb of the magnet to create a single shorted turn. Alternatively or additionally, some of the copper in each cable can be insulated from the HTS tape in such a way that it acts as a secondary coil (and then connected so that it is shorted). This results in a much faster loss of current in the magnet, but the reduction in copper to which the current can be diverted may result in more heating before the dump is initiated.

Lengthening the Pre-Quench

As described above, the "pre-quench" phase occurs when a single-tape quench cascades to other tapes in the cable (i.e. to other tapes which are electrically connected to that tape via the copper stabilisers). The cascade happens due to local heating around the single tape quench, and redistribution of the current from the quenched tape.

Cables with greater numbers of tapes will generally have longer pre-quench phases, as it takes more time for the cascade to affect all of the tapes. In addition, since the current from the quenched tape is shared between more superconducting tapes, the rise in current in each individual tape is lower, and so a cascade is less likely to occur from a single-tape quench.

The upper limit of this would of course be a coil which is effectively a single cable—i.e. where all of the tapes in the coil are connected by conductive material. This can be achieved by leaving out the insulation between cables (i.e. a copper-to-copper connection), or by "insulating" the cables with a metal or other similarly conductive material (which is still less conductive than copper), for example stainless steel, or brass. These are respectively known as "non-insulated" (NI) coils and "metal insulated" (MI) coils. The idea is to allow the excess current due to a single-tape quench to be shared among all of the tapes in the coil (and all of the stabiliser, both copper and the other metal if present), rather than just within the cable. This allows the hot spot to spread to adjacent turns. If the ratio of coil's stored energy to the enthalpy available from heating the coil's cold mass to 300K is less than unity this will result in the coil's stored energy being used to warm up the cold mass of the magnet without damage.

However, if the ratio is above unity, or the aspect ratio of the coil (length to cross section ratio) is high, the entire cross section of the coil would be quenched before the majority of the magnet's stored energy was dissipated.

Furthermore, in a magnet with multiple coils (such as the toroidal field coils of a tokamak), if one coil were to start quenching before the others this would result in imbalances between the electromagnetic forces acting on neighbouring coils, which could cause significant damage to the magnet.

While NI or MI coils are inherently more stable than conventional insulated HTS coils, the fact that any full quench in a large magnet like a tokamak with more stored energy than integrated cold mass enthalpy would eventually be catastrophic provides an obstacle to their use in large scale applications, in particular in nuclear fusion reactors. There is therefore a need to provide a magnet which uses NI or MI coils from which the energy may be dumped when a quench (or pre-quench likely to result in a full quench) is detected.

This can be done by introducing a circuit breaker into the magnet coil. Previous work has shown the possibility of adding joints to an HTS magnet, and these could be used to provide such a circuit breaker. The "dump" system would then consist of means to demount the joints, and a resistance which provides a bypass around the demounted joint. The bypass path needs to cause as little change in inductance as possible, to minimise the tendency to arc. If the bypass is not present, or causes the transport current to flow on a significantly different trajectory, changing the inductance of the coil, the gap left by the joint will arc, which would likely cause similar levels of damage to the quench. The resistive bypass will need to be sufficiently large that the heating caused by the energy dump will not cause excessive heating (e.g. warming to room temperature, or slightly above, having dissipated all of the stored magnetic energy).

Figure 5:
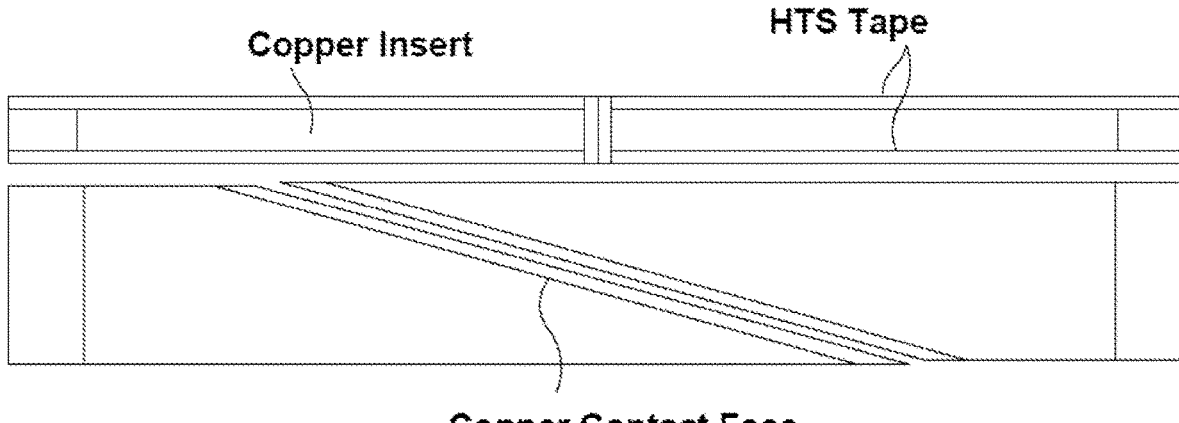
FIG. 5 is a schematic diagram of a scarfed shaking hands joint.

One example of a demountable joint which could be used is the "pressed shaking hands scarfed joint" shown in FIG. 5. The figure only shows the joint for two HTS tapes, and it may be extended to more tapes (as will be required to connect an entire coil). A copper jointing piece is inserted between each of HTS tapes which is scarfed to match the tapes but finished with a facing piece which maximises the surface area for the tapered butt connection between pairs. The faces of the connecting pieces in each pair can be pressed together, optionally with indium foil inserted between the faces to reduce contact resistance. This joint provides easy demountability at the expense of slightly increased resistance. Other joints may also be appropriate, particularly where they rely on components being pressed together.

The magnet may be constructed such that the joint is maintained by an externally applied pressure (e.g. provided by a hydraulic press) which opposes the electromagnetic Lorenz hoop stress which acts to cause each TF coil to expand. When a quench is detected, the external pressure is released slightly, causing the joint to come apart under the action of Lorenz force. Only a small gap (e.g. 1 mm) is required, as any gap between the joint will have a larger resistance than the bypass. When the joint is demounted, current flows through the bypass, and the resistance of the bypass dissipates the energy in the coil safely.

The bypass should be made of a material with a modest electrical conductivity (i.e. less than copper, and sufficiently small to act as a resistor, but not so small that the joint will arc when demounted) and some ductility. The ductility will be needed to maintain a good connection to both sides of the joint when it is demounted. One suitable material is BeCu (beryllium copper). The bypass should be large enough so that it does not heat excessively when the magnet's stored energy is dumped into it.

Figure 6:
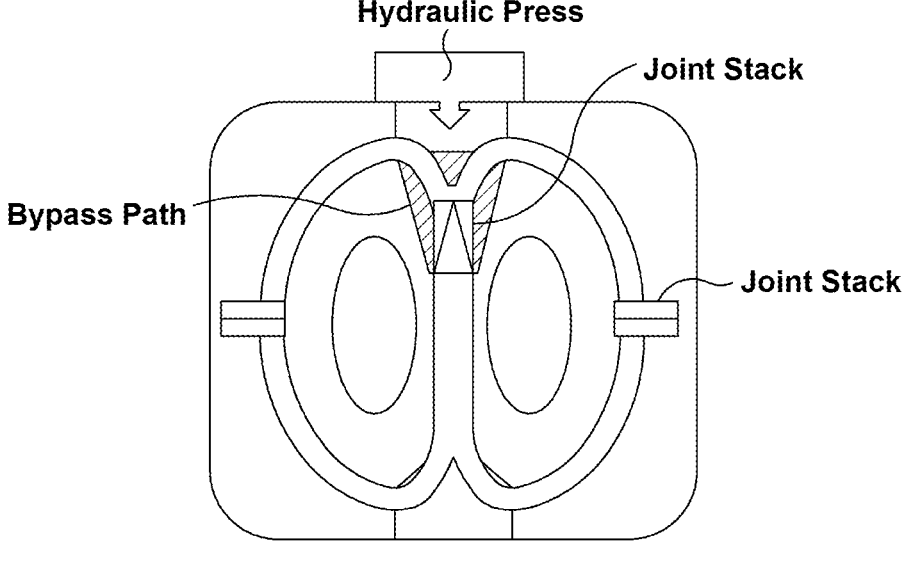
FIG. 6 is a schematic diagram of a nuclear fusion reactor.

An example magnet structure is shown in FIG. 6, for a spherical tokamak. The spherical tokamak has two joints in each toroidal field coil limb—a first joint at the top of the central column, and a second joint at a mid-point of the return limb. The joint at the top of the central column is demountable. The joint at the mid-point of the return limb may or may not be demountable—it is there so that a part of the return limb may be removed to perform maintenance or replacement of components within the toroidal field coil. The joint at the top of the central column is kept pressed by a hydraulic press, and surrounded by a bypass. As described above, when a quench is detected in the toroidal field coil, the hydraulic press is released, and the joints at the top of the central column are demounted. All of the current in the toroidal field coil then flows through the bypass, dumping the energy from the coil.

While the circuit breaker is most advantageous in an NI or MI coil (since there is no other option for dumping the energy), it could also be used in an otherwise conventional magnet.

Where examples have been described above in terms of certain field coil structures, it will be appreciated that the principles can be generalised to other particular types of field coil, for example toroidal field coils and poloidal field coils for nuclear fusion reactors.

While the above examples have been described in terms of HTS field coils, it will be appreciated that the solutions resulting from problems in HTS field coils may equally be applied to LTS field coils. For example the systems herein may be applied as redundant detection or protection systems in an LTS coil.

The invention claimed is:

1. A method of detecting quenches in a superconducting magnet comprising a plurality of cables comprising HTS material in a coil, the method comprising:
   providing a plurality of optical fibres, wherein each cable of the coil of the superconducting magnet is in thermal contact with at least one of the optical fibres;
   monitoring backscattered light from each of the optical fibres;
   comparing changes in wavelength of backscattered light from each optical fibre;
   detecting a change in temperature of a cable of the coil on the basis of a change in wavelength observed in one or more first optical fibres of the plurality of optical fibres which are in thermal contact with the cable, but not observed in one or more second optical fibres of the plurality of optical fibres which are not in thermal contact with the cable; and
   in response to said detection, determining that the cable has quenched.

2. A method according to claim 1, wherein each cable is formed from a plurality of jointed cable sections, and each optical fibre is in thermal contact with a single section of cable between joints.

3. A method according to claim 1, wherein each of the cables comprises one of the optical fibres.

4. A method according to any claim 1, and further comprising monitoring strain of the superconducting magnet by analysing changes in wavelength of backscattered light which are observed in substantially all of the optical fibres.

5. A method according to any claim 1, further including analysing said changes in wavelength in said first optical fibres to determine a magnitude of the change in temperature; and
   determining that the cable has quenched if said change in temperature exceeds a threshold in a subset of the fibres.

6. A method of detecting quenches in a superconducting magnet comprising a plurality of cables comprising HTS material in a coil, comprising:
   providing a plurality of optical fibres, wherein each cable of a coil of the superconducting magnet is in thermal contact with at least one of the optical fibres;
   monitoring backscattered light from each of the optical fibres;
   comparing changes in wavelength of backscattered light from each optical fibre;
   detecting a change in temperature of one or more cables of the coil on the basis of a change in wavelength observed only a subset of the plurality of optical fibres, but not observed in the rest of the optical fibres; and
   in response to said detection, determining that the cable has quenched.

7. A superconducting magnet comprising:
   a plurality of turns comprising cables comprising HTS superconducting material;
   a plurality of optical fibres, wherein each cable is in thermal contact with at least one of the optical fibres;
   a control unit configured to:
   monitor backscattered light from each of the optical fibres;
   compare changes in wavelength of backscattered light from each optical fibre;
   detect a change in temperature of a cable of the coil on the basis of a change in wavelength observed in one or more first optical fibres of the plurality of optical fibres which are in thermal contact with the cable, but not observed in second optical fibres of the plurality of optical fibres which are not in thermal contact with the cable; and
   on the basis of said detection, determine that the cable has quenched.

8. A superconducting magnet according to claim 7, where each optical fibre is in thermal contact with a plurality of the cables.

9. A superconducting magnet according to claim 7, wherein each of the cables comprises one of the optical fibres.

10. A superconducting magnet according to claim 7, wherein the controller is further configured to monitoring strain of the superconducting magnet by analysing changes in wavelength of backscattered light which are observed in substantially all of the optical fibres.

* * * * *